United States Patent
Hickey

(10) Patent No.: US 8,486,359 B2
(45) Date of Patent: Jul. 16, 2013

(54) AMMONIUM RECOVERY FROM WASTE WATER USING $CO_2$ ACIDIFIED ABSORPTION WATER

(75) Inventor: Robert Hickey, Okemos, MI (US)

(73) Assignee: Coskata, Inc., Warrenville, IL (US)

( * ) Notice: Subject to any disclaimer, the term of this patent is extended or adjusted under 35 U.S.C. 154(b) by 78 days.

(21) Appl. No.: 13/190,355

(22) Filed: Jul. 25, 2011

(65) Prior Publication Data

US 2013/0028827 A1    Jan. 31, 2013

(51) Int. Cl.
*C01C 3/00*    (2006.01)
(52) U.S. Cl.
USPC .......... 423/237; 423/356; 423/365; 210/603; 210/903; 435/243; 435/262
(58) Field of Classification Search
USPC ... 423/356, 365, 237; 210/603, 903; 435/243, 435/262
See application file for complete search history.

(56) References Cited

U.S. PATENT DOCUMENTS

| | | |
|---|---|---|
| 5,540,840 A | 7/1996 | Heitkamp et al. |
| 7,416,644 B2 | 8/2008 | Bonde |
| 7,569,146 B2 | 8/2009 | Peyton et al. |
| 7,819,934 B2 | 10/2010 | Galliher et al. |
| 7,831,389 B2 | 11/2010 | Yamada |
| 7,866,638 B2 | 1/2011 | Neumann et al. |
| 7,883,884 B2 * | 2/2011 | Bonde et al. ................. 435/236 |
| 2003/0211585 A1 | 11/2003 | Gaddy et al. |
| 2008/0302722 A1 * | 12/2008 | Burke ........................... 210/603 |
| 2010/0227377 A1 | 9/2010 | Adams et al. |
| 2011/0146489 A1 * | 6/2011 | Dube et al. ..................... 95/199 |

* cited by examiner

*Primary Examiner* — Steven Bos

(57) ABSTRACT

The processes are utilized to recover ammonium from waste water using $CO_2$ acidified absorption water. The process is particularly suited for utilization of cellular matter and a $CO_2$ rich tail gas from a syngas fermentation process and derives significant benefit from the recovery of ammonium bicarbonate and ammonium carbonate. Ammonia and ammonium are recovered from the treatment of the syngas as an ammonium rich solution, at least a portion of which is recycled to the fermentation zone to aid in the production of liquid products. A carbon dioxide rich gas produced by fermentation is used to capture the ammonia and ammonium, forming the ammonium rich solution.

20 Claims, 3 Drawing Sheets

US 8,486,359 B2

AMMONIUM RECOVERY FROM WASTE WATER USING CO₂ ACIDIFIED ABSORPTION WATER

BACKGROUND OF THE INVENTION

1. Field of the Invention

The present invention relates to a method for recovering ammonium from waste water using $CO_2$ acidified absorption water.

2. Background of the Invention

Various flow schemes have been proposed to recover ammonium from waste water that is highly contaminated with ammonium and ammonia. These generally involve raising the pH of the waste water to 9.0 or above, stripping the ammonia and then capturing it in an acidic scrubbing solution such as sulfuric acid (most common), hydrochloric acid or nitric acid. Conventional stripping towers, steam strippers, vacuum strippers and membrane systems (hollow fibers) have all been used at commercial and/or pilot scale.

Conventional methods for removal of ammonia, COS, and HCN from syngas prior to its use generally involves scrubbing with aqueous solutions to remove these compounds from the syngas with subsequent discharge of the scrubbing solutions to wastewater treatment or via alternate disposal methods.

Modern processes for ammonia removal include the water wash process in which the syngas is scrubbed by water, which dissolves the ammonia. The resulting scrubbing solution is pumped to an ammonia still where steam is used to strip out the ammonia. The ammonia vapors from the still can be processed to form ammonium sulfate, condensed to form a strong ammonia solution, incinerated or catalytically converted to nitrogen and hydrogen which are then recycled back into the gasifier.

Another process for ammonia removal from coke oven gas is the PHOSAM process developed by US Steel. This process absorbs the ammonia from the gas stream using a solution of monoammonium phosphate. The process produces saleable anhydrous ammonia, but operates at temperatures on the order of 50 degrees Celsius and pressures up to 190 psig (approximately 13 atmospheres of pressure gauge) in the stripper column. There is a need for a more robust and cost effective method for the treatment of syngas, particularly when used for biological transformation to useful liquid products such as ethanol, acetic acid or butanol.

Well known biological treatment processes used in concert with water based scrubbers can meet the objectives of high removal of ammonia, COS and HCN from syngas. Biological treatment processes can operate at atmospheric pressure and low temperatures without the excessive cost of expensive chemicals and operate without the generation of hazardous and/or toxic wastes. Biological treatment processing of ammonium, COS, and HCN absorbed into water from gas streams has been done before. Ammonia is, in general, removed using a slightly acidic or neutral pH scrubbing solution and this spent solution is sent to an aerobic wastewater treatment system where the ammonia is oxidized to nitrate and the nitrate subsequently reduced to nitrogen gas via denitrification, generally using an added organic electron donor such as methanol.

As generally described above ammonia may be removed from a system using a strong mineral acid such as hydrochloric acid (HCl) or sulfuric acid ($H_2SO_4$) to react with the alkaline ammonia, forming a solution containing an ammonium salt such as ammonium chloride ($NH_4Cl$) or ammonium sulfate (($NH_4$)$_2SO_4$). As this method requires the input of a strong acid to the system, there is an added expense for the cost of the chemicals and also the increased design requirements of any vessels, piping, hoses, and other chemical handling equipment so that these components can withstand the acidic environment. The ammonium salt may be used or sold as a concentrated solution or may be processed and removed from the system.

Large amounts of ammonia containing materials can result from the utilization of biomass to produce biofuels. Biofuels production for use as liquid motor fuels or for blending with conventional gasoline or diesel motor fuels is increasing worldwide. Such biofuels include, for example, ethanol and n-butanol. One of the major drivers for biofuels is their derivation from renewable resources by fermentation and bioprocess technology. One available technology path to convert lignocellulosic biomass to ethanol is to convert lignocellulosic biomass to syngas (also known as synthesis gas, primarily a mix of CO, $H_2$ and $CO_2$ with other components such as $CH_4$, $N_2$, $NH_3$, $H_2S$ and other trace gases) in a gasifier and then ferment this gas with anaerobic microorganisms to produce biofuels such as ethanol, propanol, n-butanol or chemicals such as acetic acid, propionic acid, butyric acid and the like. This technology path can convert all of the components to syngas with good efficiency (e.g., greater than 75%), and some strains of anaerobic microorganisms can convert syngas to ethanol, propanol, n-butanol or other chemicals with high (e.g., greater than 90% of theoretical) efficiency. Moreover, syngas can be made from many other carbonaceous feedstocks such as natural gas, reformed gas, peat, petroleum coke, coal, solid waste and land fill gas, making this a more universal technology path.

In the gasification of biomass, the preponderance of the nitrogen in the biomass is converted to ammonia. When the syngas is cooled and scrubbed to remove particulates and other contaminants, this ammonia is to a large degree, removed in the scrubber/condensate flow stream. Treatment of this mass of ammonium requires a considerable sized waste water treatment system. If a significant fraction of this ammonium can be recovered for use in the fermentation itself and/or for export off site, a large savings in the capital and operating cost of waste water treatment can be realized, as no additional nitrogen needs to be purchased for the syngas fermentation and there may the opportunity to market the remaining ammonium-nitrogen as a co-product.

SUMMARY OF THE INVENTION

In the process of the present invention, summarized in its simplest form, a condensate stream from cleaning and cooling syngas containing the ammonia/ammonium (mostly present as ammonium since the CO2 in the syngas neutralizes the alkalinity produced by dissociation of the ammonia absorbed into the water stream), is stripped using a suitable carrier gas, such as air, or using a vacuum In most cases, the pH in the selected contactor will need to be adjusted upwardly to obtain more in the ammonia form to achieve greater stripping efficiency. The ammonia rich carrier gas is then contacted with a liquid rich in dissolved $CO_2$ in a scrubber/absorber. The ammonia is absorbed into this scrubbing solution and converted to predominantly the dissolved ammonium form, provided the pH is maintained at least one log unit below the pKa of ammonia. The scrubbing solution is maintained at this pH by cycling the scrubbing solution and contacting it with the tail gas from the fermentation process that will have between a 45% to 75% mole fraction of $CO_2$. Overall it is possible to generate solutions of scrubber water that, depending on the purge rate and recycle rate, has any-where from approximately 0.8% ammonium to approximately 14% ammonium for tail gas $CO_2$ concentrations of 45% and 75% mole fraction. Chilling the scrubber water to lower temperatures and, therefore increasing $CO_2$ solubility, will improve the maximum ammonium concentration that can be achieved in this solution, as would increasing the pressure in the scrubbing system.

Essentially the proposed process is a green technology. The recovered ammonium can be used in the anaerobic syngas fermentation as the nitrogen source and/or for reuse/sale offsite, or in the case of co-location with a corn ethanol facility, use in the yeast based fermentation as the nitrogen source. Since the ammonium is buffered by bicarbonate and carbonates formed from the dissolved $CO_2$, this solution can provide some of the alkalinity needed in the fermentation process itself. When mineral acids are used the alkalinity is not recovered.

The process of this invention is particularly beneficial when integrated with the production of liquid products from syngas. Of most interest in this invention are waste water streams from the treatment of syngas where the process of this invention was found to have unique benefits when incorporated into a syngas biofermentation process. In such fermentation arrangements there is a tail gas produced from fermentation, and any reject gas flows from $CO_2$ scrubbing and the like, that have a high mole fraction of $CO_2$ (generally 45% to 75% mole fraction). It is feasible to use dissolved $CO_2$, a relatively weak acid, in place of the typical mineral acids that are used for recovery of ammonia. The dissolved $CO_2$ solution can be generated by contacting the scrubber liquid used to recover the ammonia with the tail gas from the fermentation system and then recycling this liquid to capture ammonia stripped from the waste water. As a result no mineral acid is required for capturing the ammonium. This eliminates the need for the expense of the mineral acid and the need to maintain such acid on-site.

The instant invention is compatible with most of the ammonia stripping apparatus used in such processes, such as conventional strippers, vacuum strippers and membrane strippers, as mentioned above. It has recently been proposed to use hollow fibers for stripping, indicating it may be possible to achieve reasonable stripping efficiency without pH adjustment.

For use in syngas fermentation and/or use in a co-located corn to ethanol plant, this ammonium solution is suitable for use therein as is. Sale of the ammonium off-site would likely require the solution to be concentrated using RO, electrodialysis, evaporation or other concentrating technology.

Accordingly in one embodiment this invention is a process for removing ammonia and or ammonium from an aqueous stream and recovering ammonium carbonate and ammonium bicarbonate. The process comprising the steps of adjusting the pH of a liquid solution comprising ammonium to convert ammonium in the solution to free ammonia and produce a converted solution and stripping ammonia from the converted solution in an ammonia stripping vessel to produce a gas phase ammonia stream. Contacting the ammonia stream with a scrubbing liquid comprising dissolved $CO_2$ in a scrubbing vessel produces ammonium bicarbonate and ammonium carbonate. The process withdraws an ammonium liquid comprising ammonium carbonate and ammonium bicarbonate from the scrubbing vessel and recovers a first portion of the ammonium liquid as an ammonium product stream and recovers a second portion of the ammonium liquid by contact with a $CO_2$ containing gas stream and a make-up liquid to produce the scrubbing liquid.

In a more detailed embodiment the invention is a process for recovering ammonium carbonate and ammonium bicarbonate from an ammonium containing solution generated in the treatment and fermentation of biomass derived syngas. The process includes the steps of generating a raw syngas stream by the gasification of biomass. The process then cools and scrubs the raw syngas stream in a scrubber/cooler to generate a scrubbed syngas stream and a condensate stream containing volatile compounds and ammonium. The scrubbed syngas stream enters a fermentation zone to produce a fermentation product, a tail gas stream comprising $CO_2$, and a biosolids stream. The biosolids stream passes to a digester to decompose the biosolids and recover an ammonium containing solution from the digester. Removing volatile compounds from the condensate stream by stripping or other means such as adsorption generates a scrubbed condensate stream containing ammonium. At least a portion of the scrubbed condensate stream and the ammonium containing solution passes to an ammonia stripping vessel that maintains the pH in the ammonia stripping vessel at least one log unit below than the pKa of ammonia to maintain free ammonia in the ammonia stripping vessel. Stripping ammonia from the ammonia stripping vessel with a stripping gas stream produces an ammonia gas stream. Contacting the ammonia gas stream with an ammonia scrubbing liquid comprising dissolved $CO_2$ in a scrubbing vessel produces ammonium bicarbonate and ammonium carbonate that is withdrawn from the scrubbing vessel as an ammonium liquid comprising ammonium bicarbonate and ammonium carbonate. A first portion of the ammonium liquid is recovered as an ammonium product stream and at least a portion of the ammonium product stream returns to the fermentation zone. Contacting a second portion of the ammonium liquid with the tail gas stream and a make-up liquid in a gas contacting vessel produces the ammonia scrubbing liquid comprising dissolved $CO_2$.

DETAILED DESCRIPTION OF THE INVENTION

Figure 1:
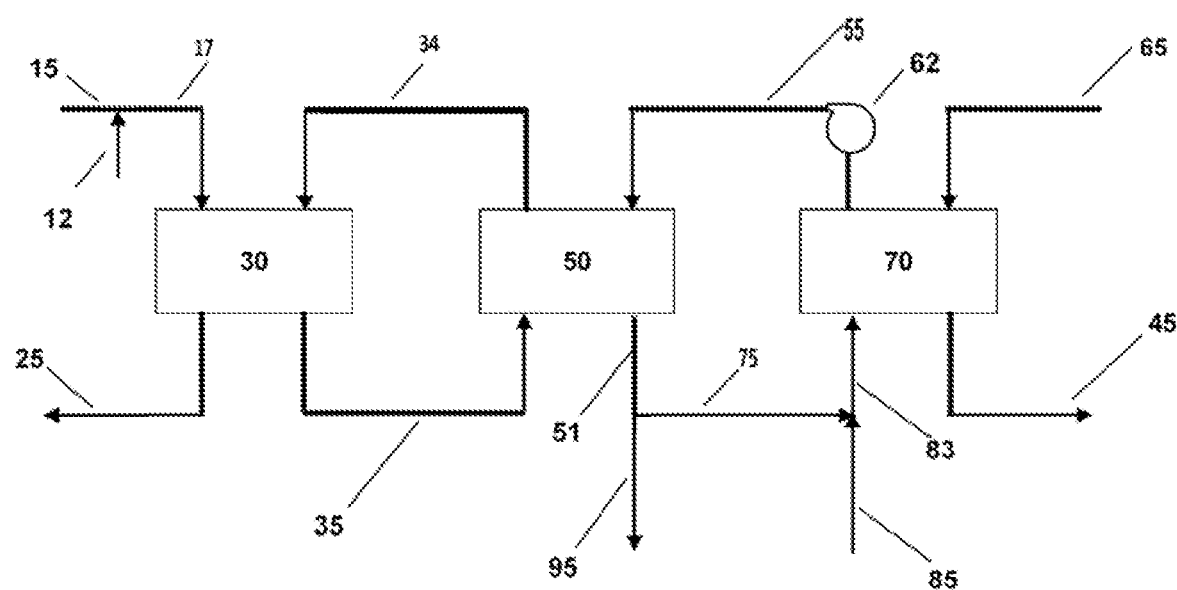
FIG. 1 is a block diagram showing the process of the present invention in its simplest form and including stripping and recovery of ammonium from syngas scrubbing using a $CO_2$ rich gas stream to absorb ammonium stripped from an ammonium rich stream, such as a syngas scrubber stream, with pH adjusted to provide sufficient unionized ammonia to effectively strip ammonia in a conventional stripper system.

This invention may any be used to treat any aqueous stream that contains large amounts of ammonia or ammonium. Useful input streams for the practice of this invention will typically a have combined concentration of ammonia and ammonium of greater than 0.1 to 1.0 wt %. Substantial amounts of ammonium carbonate and ammonium bicarbonate may be present in the feed stream.

Stripping of the ammonia stream from the aqueous input stream ordinarily takes place in an ammonia stripping vessel. With adjustment of the pH, stripping of the input stream will yield the gas stream containing primarily ammonia and any other volatile compounds that are not removed by pretreatment of the input stream. To maintain large amounts of free ammonia, the stripping vessel is usually kept at least at the pKa and preferably up to one unit above the pKa of ammonia to convert ammonium in the solution and produce a high concentration of ammonia in the converted solution so that the mole fraction of ammonia in the converted solution exceeds the mole fraction of ammonium.

Ammonia may be recovered from the stripping vessel in any manner that brings gas phase ammonia into intimate contact with a scrubbing liquid containing dissolved $CO_2$. The pH of the scrubbing liquid is typically adjusted to 8.0 or lower. The dissolved $CO_2$ is typically maintained at an equilibrium concentration in the scrubbing liquid with the $CO_2$ mole fraction in the tail gas. Higher concentrations of dissolved $CO_2$ may be obtained by chilling and/or pressurizing the scrubbing liquid to change the equilibrium concentration. The contacting of the scrubbing liquid may take place in a scrubbing vessel that provides a large volume for direct contacting and mixing of the streams.

Alternatively vacuum stripping may draw a gas phase ammonia stream out of the ammonia stripping vessel. An eductor device that uses the scrubbing liquid as the motive fluid may simultaneously draw the ammonia out of the stripping vessel while also in conjunction with the associated piping may act as a scrubbing vessel to promote intimate mixing of the ammonia gas and the scrubbing liquid. Those skilled in the art are aware of other methods to withdraw ammonia gas from the stripping vessel and mix the scrubbing liquid therewith. Such methods can use membrane systems with various pressure control and contactors that will act as scrubbing vessels for mixing the ammonia with the dissolved $CO_2$ The $CO_2$ of the scrubbing solution reacts with the ammonium to produce ammonium carbonate and ammonium bicarbonate in an ammonium liquid. A portion of the ammonium liquid can be used as a product stream. In the case of an integrated biofermentation process the ammonium liquid is part of the process flow that provides ammonium to the fermentation zone. Through the buffering of the carbonate and bicarbonate the ammonium can provide some of the alkalinity needed in the fermentation zone.

In another aspect of the invention, at least a portion of the ammonium rich solution is passed to a concentrator to form a concentrated ammonia product. Any known concentrating mechanism may be used. The concentrated ammonia product may then be sold as a raw material for other processes which require ammonia, sold for use as a fertilizer, or used in another process co-located at a facility which includes the process described in this disclosure.

Another portion of the ammonium liquid passes to a $CO_2$ absorption vessel where it is combined with a make-up water stream and contacted with a $CO_2$ containing gas stream to provide additional scrubbing liquid. The scrubbing solution will usually comprise water which is constantly replenished with make-up water to replace ammonium liquid withdrawn for product use. The $CO_2$ gas stream that contacts the scrubbing water and the ammonia liquid will usually have a $CO_2$ mole fraction that stream is greater than 40%.

Of most interest in this invention are waste water streams from the treatment of syngas where the process of this invention was found to have unique benefits when incorporated into a syngas biofermentation process. A variety of gasification processes are known for the production of syngas from various carbonaceous materials. The syngas is produced by gasifying biomass in a gasifier. "Biomass" as used in this application means organic solid material including municipal solid waste. Examples of material that would be considered biomass under this definition include, but are not limited to: corn, corn stalks, sugarcane, bagasse, wood, sawdust, paper, cardboard, cotton, cotton fiber, leaves, and municipal solid waste. Any process of gasifying the biomass to syngas may be used.

Once gasified, the biomass is converted to a syngas effluent stream comprising carbon monoxide, carbon dioxide, hydrogen, ammonia, and particulates. This syngas effluent stream is then scrubbed by contacting with a scrubber liquid, typically comprising water, to form a scrubbed gas stream and the scrubber condensate stream comprising ammonia and ammonium that serves as the previously described input stream. In addition, the syngas will often contain dissolved volatile compounds including hydrocarbons, COS and HCN. The syngas will typically undergo scrubbing for the removal of these compounds with the scrubber liquid. The scrubber liquid may undergo gas stripping, contact with activated carbon, or other treatment to remove HCN and volatile compounds before adjusting the pH of the syngas scrubber liquid. The scrubber may also serve as a cooler to reduce the temperature of the syngas stream. The scrubbed gas stream from the scrubber or scrubber/cooler is passed to the fermentation broth in a fermentation zone which comprises microorganisms to form liquid products and a carbon dioxide rich gas. Any suitable microorganisms may be used.

In some processes it is advantageous to keep the fermentation zone at a neutral or alkaline pH. An advantage of the present invention is that ammonia is more readily soluble in water than many calcium-containing alkaline materials, and thus ammonia and ammonium are easier to pass to the various components of the present invention. The recycling of at least a portion of the ammonium rich solution to the fermentation zone can also add sufficient nitrogen to provide the cellular maintenance and growth needs of the microorganisms.

The use of microorganisms for bioconversions of CO and $H_2/CO_2$ to acetic acid, ethanol, and other products are well known. For example, in a recent book concise description of biochemical pathways and energetic of such bioconversions have been summarized by Das, A. and L. G. Ljungdahl, Electron Transport System in Acetogens and by Drake, H. L. and K. Kusel, Diverse Physiologic Potential of Acetogens, appearing respectively as Chapters 14 and 13 of Biochemistry and Physiology of Anaerobic Bacteria, L. G. Ljungdahl eds., Springer (2003). Any suitable microorganisms that have the ability to convert the syngas components CO, $H_2$, $CO_2$ individually or in combination with each other or with other components that are typically present in syngas may be utilized. Suitable microorganisms and/or grown conditions may include those disclosed in U.S. patent application Ser. No. 11/441,392, filed May 25, 2006, that corresponds to U.S. pregrant publication number 2007/0275447 entitled "Indirect Or Direct Fermentation of Biomass to Fuel Alcohol, now abandoned," which discloses a biologically pure culture of the microorganism Clostridium carboxidivorans having all of the identifying characteristics of ATCC no. BAA-624; and U.S. Pat. No. 7,704,723 filed Aug. 31, 2006, and issued Apr. 27, 2010, entitled "Isolation and Characterization of Novel Clostridial Species," which discloses a biologically pure culture of the microorganism Clostridium ragsdalei having all of the identifying characteristics of ATCC No. BAA-622; both of which are incorporated herein by reference in their entirety. Clostridium carboxidivorans may be used, for example, to ferment syngas to ethanol and/or n-butanol. Clostridium ragsdalei may be used, for example, to ferment syngas to ethanol.

DESCRIPTION OF THE PREFERRED EMBODIMENT(S)

Referring now to the drawings in greater detail, there is illustrated in FIG. 1 a block diagram of the process of the present invention in its simplest form. As shown, a stream 15 rich in ammonium, from a source, such as a syngas condensate stream, is combined with a caustic agent 12, such as NaOH or other alkali, to adjust the pH upward such that most of the ammonia is present as unionized or free ammonia. This combined stream 17 is sent to stripping tower 30, where it is contacted with a gas stripping stream 34 that is lean in ammonia concentration and recycled to the stripping tower 30 from an ammonia absorption vessel 50. A scrubbed water stream 25, that has a significantly reduced ammonium concentration, is discharged from stripping tower 30 and sent to waste water treatment while an ammonia rich gas stripping stream 35, which results from stripping the ammonia from stream 25, is sent to the ammonia scrubbing tower 50 for recovery or capture of the ammonia.

In the ammonia scrubbing tower 50, gas stream 35 is contacted with a $CO_2$ rich ammonia absorption liquor stream 55 and a significant proportion of the ammonium is absorbed into the liquor from stream 35. Tower 50 discharges an ammonia lean gas stream as gas stripping stream 34 back to the ammonia stripper tower 30. The absorption liquor discharged from the scrubbing tower 50 via line 51, now rich in dissolved ammonium bicarbonate and ammonium carbonate formed through a reaction between the ammonia and the $CO_2$, is split with a first portion 95 discharged for use at the site or sale off site and a second portion 75 being sent back to a $CO_2$ absorption column 70, where the concentration of dissolved $CO_2$ is replenished. Make-up water stream 85 is added to the $CO_2$ absorption column 70 in combination with the second portion 75 via a combined stream 83 to maintain the volume lost by purging of first portion 95.

In the $CO_2$ absorption column 70, a $CO_2$ rich gas stream 65 is contacted with combined stream 83 to replenish the concentration of dissolved $CO_2$. Combined stream 83 contains the combined flows of make-up water 85 and the second portion 75 of liquor from the ammonium scrubbing tower 50. The $CO_2$ rich ammonia absorption liquor stream 55 is then provided to the scrubbing tower 50 using pump 62. Exit gas 45 from the $CO_2$ absorption column 70 is treated as appropriate and then discharged to the atmosphere.

Figure 2:
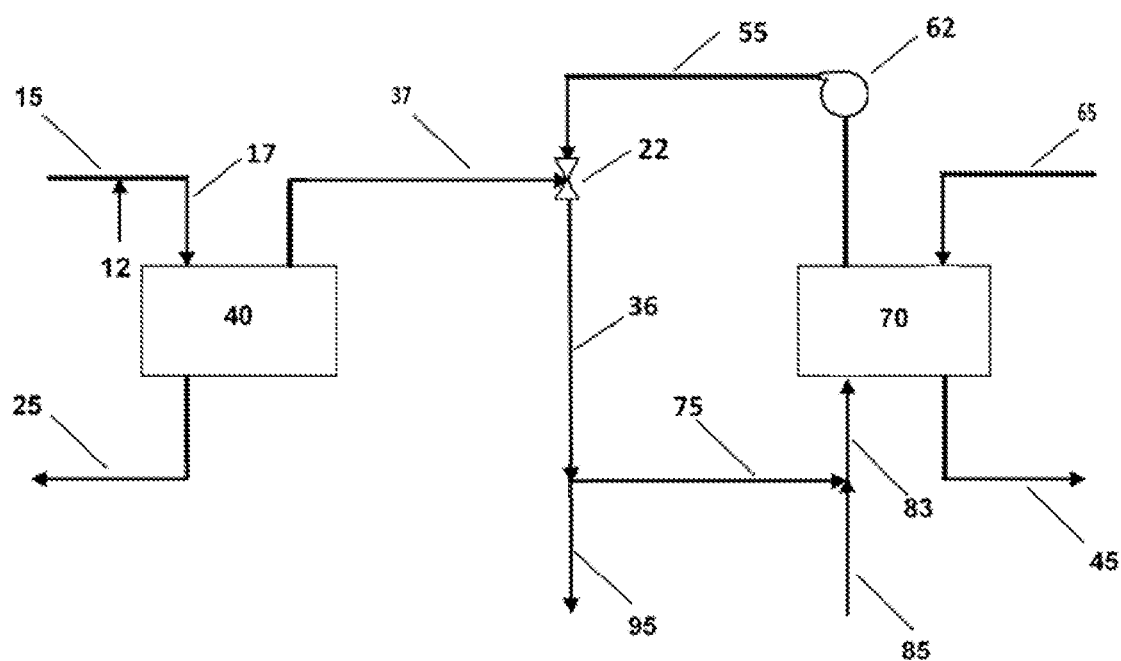
FIG. 2 is a block diagram of another embodiment of the present invention that shows use of a flash vacuum stripper in place of a conventional gas stripper. No gas stripping stream is required with this approach.

In FIG. 2, instead of using an ammonia scrubbing tower 50 and a circulating scrubbing gas to carry the ammonia to an ammonium scrubbing tower as in FIG. 1, the $CO_2$ rich ammonium absorption liquor stream 55 from $CO_2$ absorption column 70 runs through a venturi device 22 that pulls a vacuum to draw out ammonium rich overhead gas from a vacuum vessel 40. Line 37 transfers the ammonia from the vacuum vessel 40 into the venturi device 22 where it contacts stream 55. Absorption of the ammonia forms ammonium bicarbonate and ammonium carbonate taken by stream 36 and split into the second portion 75 for return to the $CO_2$ absorption column 70 and the first portion 95 recovered as product for use or sale offsite. Any non-condensable gases in line 37 are carried into the $CO_2$ absorption column 70 where they are released with the appropriately treated exit gas 45. In the $CO_2$ absorption column 70, the $CO_2$ rich gas stream 65 contacts the combined stream 83, that contains make-up water 85 and returned ammonium bicarbonate and carbonate from second portion 75 to replenish the concentration of dissolved $CO_2$. Pump 62 returns the $CO_2$ rich ammonia absorption liquor stream 55 to the venturi device 22.

Figure 3:
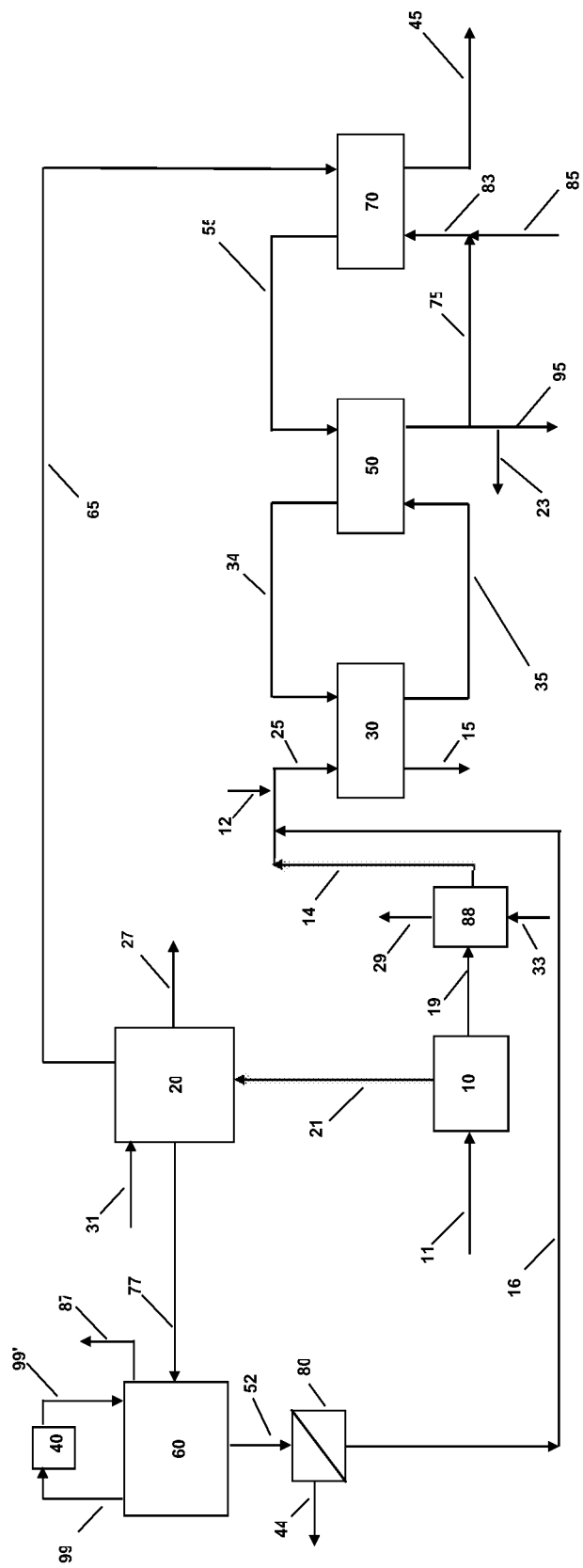
FIG. 3 is a block diagram of another embodiment of the present invention showing an integrated system where the ammonium rich stream is a combination of syngas stripper condensate and effluent from a digester for destruction of excess biosolids produced in fermentation and the $CO_2$ rich stream used to recover the ammonium is the $CO_2$ rich tail gas from said fermentation system.

FIG. 3 shows the process of the instant invention integrated with the steps for the fermentation of syngas into soluble products such as ethanol, propanol, butanol or acetate, propionate or butyrate. Note that, although shown for a syngas based fermentation, this further embodiment of the process of the present invention is applicable for any fermentation system where a tail or off-gas rich in $CO_2$ is produced and the fermentation process utilizes a source of nitrogen.

FIG. 3, incorporates the ammonia recovery arrangement depicted in FIG. 1 into its overall embodiment. In this case a combination of several streams that have high ammonia, a syngas scrubber stream carried by a line 14 and a waste water stream 16, are sent to ammonia recovery.

In this arrangement a fermentation vessel 20 delivers excess biosolids 77 for digestion in digester 60. Digester 60 may be an anaerobic digester or aerobic digester and may be equipped with a device 40 that manages excess biosolids 77 by grinding or other means that enhance degradation. Streams 99 and 99' transfer biosolids to and from device 40. Note that although shown as an internal recycle in FIG. 3, using device 40 as a pretreatment or post treatment device is also possible. Digester 60 discharges the bulk of the total suspended solids (TSS) to a separation device 80 that produces a concentrated solids stream 44 and waste water stream 16 which is low in suspended solids and rich in nutrients including ammonia.

Line 11 introduces raw syngas into a direct contact scrubber/cooler 10 for condensing and cooling. Line 21 carries cleaned syngas to fermentation vessel 20 while a condensed scrubber water stream passes via line 19 to a stripper 88.

In stripper 88 a stripping gas stream 33 removes dissolved hydrocarbons that exit as gas stream 29. Gas stream 29 is managed to utilize the energy content of the stripped hydrocarbons in the gas. The remainder of the scrubber water, now high in ammonium leaves stripper 88 via line 14.

A condensate stream 25, formed by combining scrubber stream from line 14 with waste water stream 16, has high ammonia content due to biological digestion of the excess biosolids 77 produced during fermentation. The condensate stream 25, now pH adjusted by the addition of a caustic agent from line 12, passes to passes ammonia stripping tower 30. Note that stream 25 can be sent through pretreatment to remove suspended solids and/or dissolved, non-condensable gases prior to ammonia stripping if desired.

Condensate stream 25 passes to the stripping tower 30 for recovery of ammonia which passes to scrubbing tower 50 production and recovery of ammonium carbonate and ammonium bicarbonate as previously described. A portion of the ammonium bicarbonate and ammonium carbonate that leaves scrubbing tower 50 passes to the fermentor 20 via line 23 as nitrogen input.

Fermentation vessel 20 passes the cleaned syngas from line 21 into contact with anaerobic microorganisms. The microorganisms consume the syngas and as part of their metabolic processes and excrete liquid products, such as ethanol. Nitrogen in the form of ammonium from scrubber liquid from line 23 enters fermentor 20 through line 31 along with fresh fermentation media. Line 27 recovers ethanol produced by the fermentor 20. A tail gas stream rich in $CO_2$ passes from fermenter 20 via line 65 to supply $CO_2$ to absorption column 70.

For purposes of further description a 20 million gallon per year syngas to ethanol plant is used as a calculated example of the instant invention. The raw syngas stream is cooled and scrubbed resulting in a condensate stream that has approximately 630 pounds/day of ammonia as nitrogen. Approximately 1,620 pounds/day of ammonium as nitrogen is added to the syngas fed fermentors to provide the necessary nitrogen for good cell growth. The combined purge flows from the fermentation system contain 160 pounds/day of ammonium as nitrogen and 1,460 pounds/day of organic nitrogen, primarily cell biomass plus some soluble proteins formed during the fermentation process. The fermentation purge flows are forwarded to an anaerobic digestion (AD) system equipped with a device to shear the biomass and enhance the degradation of the excess biomass wasted from fermentation. The effluent stream from the anaerobic digestion process after the solids are removed via centrifugation, membrane filtration and/or other applicable unit operation contains approximately 1,330 pounds/day of ammonium as nitrogen and an additional 130 pounds/day of organic nitrogen. This results in a combined stream of scrubber condensate and AD centrate of 1,960 pounds/day of ammonium as nitrogen and 130 pounds of organic nitrogen that is sent to an ammonium stripping/recovery unit. The tail gas stream from the fermentation process provides a stream rich in $CO_2$ that passes to the absorption column of the stripping recovery unit to provide the ammonia scrubbing liquid. The stripping system recovers 85% of the ammonium as ammonium bicarbonate and ammonium carbonate or 1,670 pounds/day. Of this, 1,620 pound/day of the ammonium is recycled back to the fermentation process. The remainder of the ammonium is available for sale off-site as a fertilizer product, disposed of off-site or simply wasted along with the remaining ammonium and organic nitrogen in the stripper bottoms to the wastewater treatment plant.

As described, the present invention provides a number of advantages, some of which have been described above and others which are inherent in the invention. Also, modifications may be proposed without departing from the teachings herein. Accordingly, the scope of the invention is only to be limited as necessitated by the accompanying claims.

The invention claimed is:

1. A process for recovering ammonium carbonate and ammonium bicarbonate from a liquid solution comprising at least one of ammonia or ammonium, the process comprising the steps of: a. adjusting the pH of the liquid solution comprising ammonium to convert ammonium in the solution to free ammonia and produce a converted solution; b. stripping ammonia from the converted solution in an ammonia stripping vessel to produce a gas phase ammonia stream; c. contacting the ammonia stream with a scrubbing liquid comprising dissolved $CO_2$ in a scrubbing vessel to produce ammonium bicarbonate and ammonium carbonate; d. withdrawing an ammonium liquid comprising ammonium carbonate and ammonium bicarbonate from the scrubbing vessel; e. recovering a first portion of the ammonium liquid as an ammonium product stream; f. contacting a second portion of the ammonium liquid with a $CO_2$ containing gas stream and a make-up liquid to produce the scrubbing liquid.

2. The process of claim 1 where the $CO_2$ mole fraction of the $CO_2$ containing gas stream is greater than 40%.

3. The process of claim 1 where a vacuum stripper strips ammonia from the converted solution.

4. The process of claim 1 where a membrane distillation system strips ammonia from the converted solution.

5. The process of claim 1 where the $CO_2$ containing gas is a tail gas from a fermentation process.

6. The process of claim 5 wherein a portion of the ammonium rich liquid passes to the fermentation process.

7. The process of claim 1 wherein a gas phase stripping stream strips ammonia from the converted solution.

8. The process of claim 1 wherein the pH of the scrubbing liquid is adjusted to 8.0 or lower.

9. The process of claim 1 wherein the mole fraction of ammonia exceeds the mole fraction of ammonium in the converted solution of step a.

10. The process of claim 1 wherein the pKa in the ammonia stripping vessel is at least one unit above the pKa of ammonia.

11. A process for recovering ammonium carbonate and ammonium bicarbonate from an ammonium containing solution generated in the treatment of biomass derived syngas, the process comprising the steps of: a. generating a syngas stream by the gasification of biomass; b. scrubbing at least a portion of the syngas stream in a syngas scrubber to generate a syngas scrubbing liquid containing ammonium and a scrubbed syngas stream; c. passing the scrubbed syngas stream to a fermentation zone to produce a fermentation product and a tail gas stream comprising $CO_2$; d. passing the syngas scrubbing liquid to an ammonia stripping vessel and adjusting the pH in the ammonia stripping vessel to at least the pKa of ammonia to maintain free ammonia in the ammonia stripping vessel; e. stripping ammonia from the ammonia stripping vessel with a stripping gas stream to produce an ammonia gas stream; f. contacting the ammonia gas stream with an ammonia scrubbing liquid comprising dissolved $CO_2$ in a scrubbing vessel to produce an ammonium liquid comprising ammonium bicarbonate and ammonium carbonate; g. recovering a first portion of the ammonium liquid as an ammonium product stream; h. passing a second portion of the ammonium liquid into contact with the tail gas stream and a make-up liquid in a gas contacting vessel to produce the ammonia scrubbing liquid.

12. The process of claim 11 wherein the fermentation zone produces biosolids as a by-product, the biosolids are decomposed in a digester, and an ammonium containing waste stream is recovered from the digester and passed to the ammonia stripping vessel.

13. The process of claim 11 wherein the $CO_2$ mole fraction of the tail gas stream is greater than 40%.

14. The process of claim 11 wherein a portion of the ammonium liquid passes to a fermentation process to provide a source of nitrogen for microorganisms contained therein.

15. The process of claim 11 wherein the pH of the ammonia scrubbing liquid is at least 8.0 or below.

16. The process of claim 11 wherein the pKa in the ammonia stripping vessel is at least one unit above the pKa of ammonia.

17. The process of claim 11 wherein the syngas contains dissolved volatile compounds including HCN, the syngas scrubbing liquid comprises water, and the syngas scrubbing liquid is treated by at least one of air stripping or contact with activated carbon adsorption to remove HCN and volatile compounds before adjusting the pH of the syngas scrubbing liquid.

18. A process for recovering ammonium carbonate and ammonium bicarbonate from an ammonium containing solution generated in the treatment and fermentation of biomass derived syngas, the process comprising the steps of: a. generating a raw syngas stream by the gasification of biomass; b. cooling and scrubbing the raw syngas stream in a scrubber and a cooler to generate a scrubbed syngas stream and a condensate stream containing volatile compounds and ammonium; c. passing the scrubbed syngas stream to a fermentation zone to produce a fermentation product, a tail gas stream comprising $CO_2$, and a biosolids stream; d. passing the biosolids to a digester to decompose the biosolids and recover an ammonium containing solution from the digester; e. removing volatile compounds from the condensate stream to generate a scrubbed condensate stream containing ammonium; f. passing at least a portion of the scrubbed condensate stream and the ammonium containing solution to an ammonia stripping vessel and maintaining the pH in the ammonia stripping vessel at least one unit above the pKa of ammonia to maintain free ammonia in the ammonia stripping vessel; g. stripping ammonia from the ammonia stripping vessel with a stripping gas stream to produce an ammonia gas stream; h. contacting the ammonia gas stream with an ammonia scrubbing liquid comprising dissolved $CO_2$ in a scrubbing vessel to produce ammonium bicarbonate and ammonium carbonate; i. withdrawing an ammonium liquid comprising ammonium bicarbonate and ammonium carbonate from the scrubbing vessel; j. recovering a first portion of the ammonium liquid as an ammonium product stream and passing at least a portion of the ammonium product stream to the fermentation zone; and, k. contacting a second portion of the ammonium liquid with the tail gas stream and a make-up liquid in a gas contacting vessel to produce the ammonia scrubbing liquid comprising dissolved $CO_2$.

19. The process of claim 18 where the $CO_2$ mole fraction of the tail gas stream is greater than 40%.

20. The process of claim 19 wherein the pH of the ammonia scrubbing liquid is at 8.0 or below.

\* \* \* \* \*